Patented Mar. 2, 1948

2,436,865

UNITED STATES PATENT OFFICE 2,436,865

DERIVATIVES OF 3-OXO-4-HYDROXY-THIOPHAN AND PROCESS FOR THE MANUFACTURE THEREOF

Paul Karrer, Zurich, Switzerland, assignor to Hoffmann-La Roche Inc., Nutley, N. J., a corporation of New Jersey No Drawing. Application August 26, 1944, Serial No. 551,443. In Switzerland July 2, 1943

Section 1, Public Law 690, August 8, 1946
Patent expires July 2, 1963

8 Claims. (Cl. 260—329)

1

Derivatives of 3-oxo-4-hydroxy-thiophan, carrying aliphatic substituents in position 2, thus corresponding to Formula I

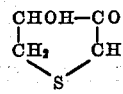

can be used as starting materials for the manufacture of pharmaceutically employable derivatives of the type of biotin; the substituent is —(CH₂)ₙ—R, n being a numeral from 1 to 4 and R is selected from this group consisting of —OH, —O-alkyl, —CN, —COOH and the functional derivatives of the latter.

It has been found that compounds of the Formula I can be obtained from thiophan-3-one-derivatives of the Formula II by the action of halogen and subsequent hydrolysis of the resulting halogen-thiophanone-derivatives III:

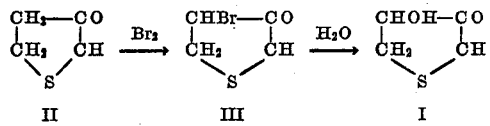

From the derivatives of 3-oxo-4-hydroxy-thiophan (I) dioximes of the Formula V are obtained by the action of hydroxy-amine, and osazones of the Formula VI by the action of phenyl-hydrazine.

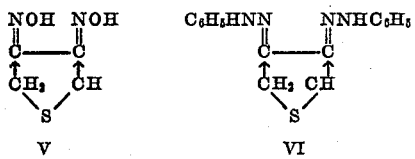

The new compounds represent intermediate products for the manufacture of medicinal preparations.

Example 1

40 parts of water are poured over 2.8 parts by weight of 2-(β-carbohydroxy-ethyl)-thiophan-3-one (Formula VII). 1.0 parts by weight of calcium-carbonate are added and, while stirring at 0° C., 0.9 part by volume of vaporous bromine are slowly passed into the solution by a current of carbon-dioxide. The introduction of the bromine-vapour takes about 2 hours. Thereupon, the liquid is diluted with a little water, saturated with sodium-chloride and left to stand for a few hours. 2-(β-carbohydroxy-ethyl)-4-hydroxy-thiophan-3-one (Formula IX) thereby separates in slightly yellowish crystals. After

2 recrystallisation from hot water the compound melts at 129–130° C.

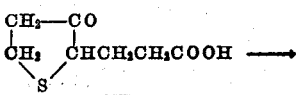

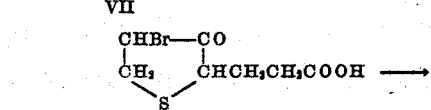

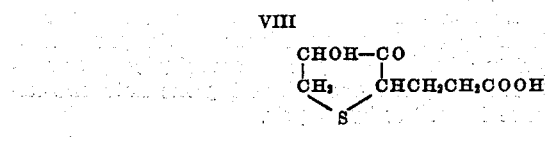

The dioxime of compound IX melts at 195–196° C. The corresponding phenyl-osazone is a pale yellow compound. Its melting point is not well defined; the compound decomposes after previous sintering above 120° C., whereby it melts with simultaneous evolution of gas.

Example 2

7 parts by weight of 2-(delta-methoxy-butyl)-thiophan-3-one (Formula X), which boils at 102–103° C. under a pressure of 0.05 mm., are dissolved in a mixture of 20 parts by volume of methanol and 13 parts of water and brominated after addition of 3.7 parts by weight of calcium-carbonate by passing in 2.1 parts by volume of bromine in gaseous state. The reaction-temperature remains at 0° C. during the whole bromination and the reaction-mixture is stirred during this process. After addition of a further part by weight of calcium-carbonate, the reaction-mixture is allowed to stand for 36 hours at 18° C., the methanol is then removed in vacuo, excess calcium-carbonate dissolved by addition of the required quantity of dilute hydrochloric acid, whereupon the reaction-mixture is extracted with ether. After evaporation of the ether, 7.0 parts by weight of a yellow oil free from halogen remain behind, in which the crude hydroxy-ketone (Formula XI) is contained.

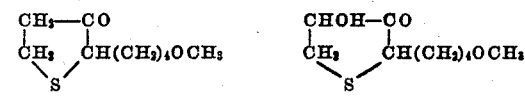

The dioxime of compound XI melts at 188–189° C., and the corresponding phenyl-osazone shows a melting-point of 141° C.

Example 3

25 parts by weight of 2-(delta-carbohydroxybutyl)-thiophanone-3 are dissolved in 100 parts by volume of methanol and then treated with 70 parts by weight of water. While stirring and cooling with ice, 20 parts by weight of gaseous bromine are passed in by means of a current of carbon-dioxide. Further 70 parts of water are gradually added. The bromine is immediately used up. The greater part of the hydrogen-bromide formed is bound by addition of calcium-carbonate. The solution is continually kept acid to Congo paper. When all of the bromine is used up, the reaction-product has separated from the aqueous methanol-solution. It is separated from the solvent and washed with 50 percent. methanol. The crystalline 2-(delta-carbohydroxy-butyl)-3-oxo-4-hydroxy-thiophan is pure after recrystallising twice from ethyl-alcohol and shows a melting-point of 117–118° C. The compound shows a strong reductive power, when tested upon ammoniacal silver-nitrate solution.

I claim:

1. 2-($\beta$-carbohydroxy-ethyl)-3-oxo-4-hydroxy-thiophan.
2. 2-(delta-methoxy-butyl)-3-oxo-4-hydroxy-thiophan.
3. 2-(delta-carbohydroxy-butyl)-3-oxo-4-hydroxy-thiophan.
4. Process for the manufacture of 2-($\beta$-carbohydroxy-ethyl)-3-oxo-4-hydroxy-thiophan, comprising halogenating 2-($\beta$-carbohydroxy-ethyl)-3-oxo-thiophan and subjecting the halogeno-ketone formed to hydrolysis.
5. Process for the manufacture of 2-(delta-methoxy-butyl)-3-oxo-4-hydroxy-thiophan, comprising halogenating 2-(delta-methoxy-butyl)-3-oxo-thiophan and subjecting the halogeno-ketone formed to hydrolysis.
6. Process for the manufacture of 2-(delta-carbohydroxy-butyl)-3-oxo-4-hydroxy-thiophan, comprising halogenating 2-(delta-carbohydroxy-butyl)-3-oxo-thiophan and subjecting the halogeno-ketone formed to hydrolysis.
7. 3-oxo-4-hydroxy-thiophan substituted in position 2 by a radical of the formula $$-(CH_2)_n-R$$

wherein $n$ is a numeral from 1 to 4, and R is selected from the group consisting of OH, O-alkyl, CN, COOH, and functional derivatives of COOH.

8. Process for the manufacture of the compounds of claim 7, comprising halogenating 2-[$(CH_2)_n$—R]-3-oxo-thiophan and subjecting the halgeno-ketone formed to hydrolysis, $n$ being a numeral from 1 to 4, and R being a member of the group consisting of OH, O-alkyl, CN, COOH, and functional derivatives of COOH.

PAUL KARRER.

REFERENCES CITED

The following references are of record in the file of this patent:

Karrer et al., "Uber Thiophanverbindungen V," Helv. Chim. Acta, vol. 27, 1944, page 239. (Photostat in 260–329.)

Certificate of Correction

Patent No. 2,436,865. March 2, 1948.

PAUL KARRER

It is hereby certified that errors appear in the printed specification of the above numbered patent requiring correction as follows: Column 1, line 2, for the word "substituents" read *substituents* (X); line 5, for that portion of the formula reading

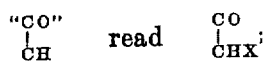

line 10, for "substituent" read *substituent X*; line 12, for "this group" read *the group*; lines 20 to 22 inclusive, in the formulae, three occurrences, for

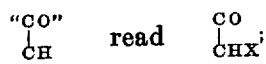

line 28, for "hydroxy-amine" read *hydroxyl-amine*; lines 33 to 35 inclusive, for that portion of Formulae V and VI reading

and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*